United States Patent [19]

Wallick, Jr. et al.

[11] Patent Number: 4,959,107

[45] Date of Patent: Sep. 25, 1990

[54] METHOD AND APPARATUS FOR TREATING LADDER RUNGS FOR FORMING ASSEMBLY WITH LADDER RAILS

[75] Inventors: Claude R. Wallick, Jr.; Thomas J. Schmitt, both of Jefferson, Ky.; Bruce E. Bogart, Floyd, Ind.; John L. Krebs, Washington, Wis.

[73] Assignee: Emerson Electric Co., St. Louis, Mo.

[21] Appl. No.: 331,822

[22] Filed: Apr. 3, 1989

[51] Int. Cl.$^5$ .............................................. C22F 1/04
[52] U.S. Cl. ..................................... 148/13; 266/103; 266/104
[58] Field of Search .................. 148/13, 154; 266/103, 266/104

[56] References Cited

U.S. PATENT DOCUMENTS 4,766,664 8/1988 Benedyk .................. 148/12.7 A

Primary Examiner—R. Dean
Attorney, Agent, or Firm—Polster, Polster and Lucchesi

[57] ABSTRACT

A method and apparatus for treating preselected areas of metallic ladder rungs wherein such metallic spaced rungs are moved in a path substantially normal to the longitudinal axes of the rungs with preselected areas of the spaced rungs passing through a controlled longitudinally extending heating zone to heat such preselected areas to a desired annealing temperature.

35 Claims, 4 Drawing Sheets

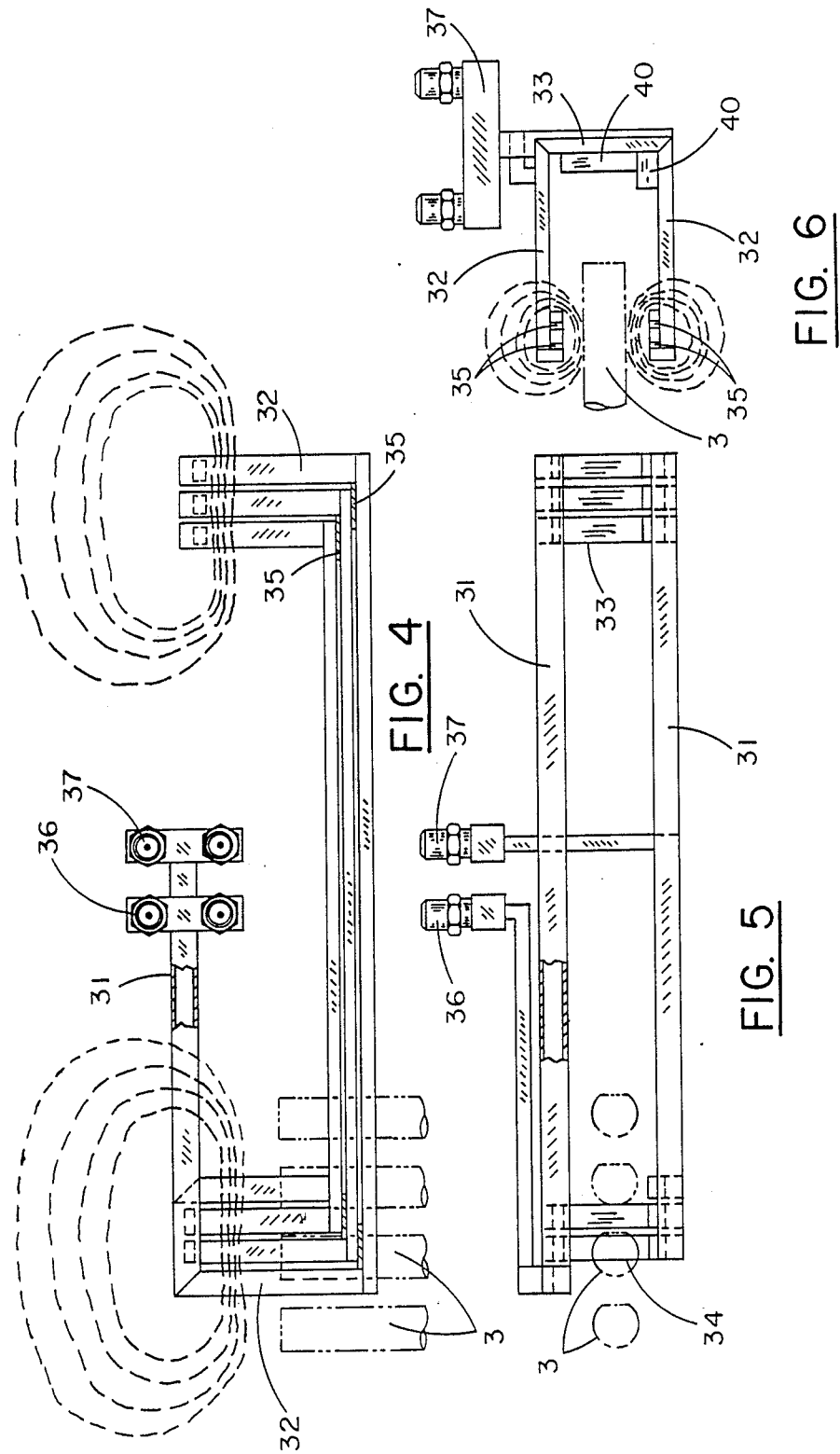

METHOD AND APPARATUS FOR TREATING LADDER RUNGS FOR FORMING ASSEMBLY WITH LADDER RAILS

BACKGROUND OF THE INVENTION

The present invention relates to a method and apparatus for construction of a ladder and more particularly to a method and apparatus for treating ladder rungs for forming assembly with ladder stiles or rails, the rungs generally being of a metallic material and in one advantageous embodiment of the present invention of an extruded aluminum alloy material.

It is known in the art of ladder manufacture to form metallic ladders, such as extruded aluminum alloy ladders, by heating opposed, extruded aluminum alloy ladder rung extremities in annular induction heating coils through which the extremities of a rung are inserted by moving each rung in a first direction along its longitudinal axis until a preselected area of the rung extremity extends into and is surrounded by the annular induction heating coil, the rung extremity being inductively heated quickly to a range of from 600° F. to 1100° F. over a very brief period of time ranging from one-half second to ten seconds so as to heat the inserted end portion without migration of the heat to the central portion of the rung, attention being directed to U.S. Pat. No. 4,766,664, issued to Joseph C. Benedyk on Aug. 30, 1988. Such an annular heating arrangement presents complex problems when adapted to the mass production of ladder rungs for subsequent forming assembly with ladder stiles or rails, requiring a first set of a plurality of such annular induction heating coils in proximate, aligned, side-by-side linear plane relation with concomitant complex problems of alignment and the moving of the ladder rungs first in one direction along the lines of their longitudinal axes for a preselected distance into such coils to treat corresponding extremities of the rungs and then moving the rungs in an opposite direction again along the lines of their longitudinal axes through a second opposed set of a plurality of annular induction heating coils in proximate, aligned, side-by-side linear plane relation. Not only is such an arrangement comparatively complex, requiring equally complex and expensive machinery, but the arrangement tends to interrupt progressive, aligned production flow patterns with the proximately positioned annular induction heating coils of each set creating problems of undesirable magnetic flux distortion and interference with the uniform and controlled heating of preselected rung areas-particularly in those instances where the rungs are of non-symmetrical cross-section along their longitudinal axes. Further, in the past arrangements, fine mechanical adjustments have been difficult, probably because of the rapid heating period. This rapid acceleration of heating does not allow the "fine tuning" necessary to prevent the melting of rungs of non-symmetrical cross-section along their longitudinal axes.

In accordance with the present invention, an economical, efficient and comparatively continuous method of treating ladder rungs for subsequent forming assembly with ladder rails and a unique structure to accomplish such inventive method are provided which inventive method and apparatus are straightforward and comparatively uncomplex in carrying out the several steps of the method and with the novel structural arrangement being readily and efficiently constructed with a minimum of parts and with a minimum of required space. Further, the present invention allows the use of high strength, extruded metallic alloys, particularly extruded aluminum alloys with a minimum of elongation thereof and with the ductility and formability of the raw extrusions not being critical. Further, the present invention avoids past problems of treating control at desired elevated production rates and the frequent "tuning" of the process and the equipment involved, as would be required with a multiple annular induction heating coil process wherein each annular coil presents a separate treating window for each ladder rung extremity. In carrying out the process of the present invention, all of the ladder rungs to be treated "see" or progressively pass through the same treating window and uniformity of treatment is readily and easily obtainable with a minimum of repair and maintenance required and with adjustment of residence time and temperature being equal for all rungs treated. Moreover, the present invention allows for rapid adjustment to treating batches of rungs of different length and of different cross-sections along the longitudinal axes, such as rungs of circular cross-section along the longitudinal axes and rungs of non-symmetrical cross-section along the longitudinal axes, such as triangular or "D" shaped rungs, all types of rungs being readily acceptable in the inventive process and structure. Furthermore, the present invention provides for careful and accurate control of temperature rises to avoid rung burning or melting, providing a controlled rung soaking process, permitting automatic power and temperature adjustments during batch rung treatment. In addition, the problem of heat migration to rung centers, which has been of major concern in past processes, requiring quick temperature elevation and subsequent quenching, has been avoided in the herein inventive process and structure, with only minimal and non-consequential heat migration to rung centers occurring without effecting permanent metallurgical changes which undesirably reduce rung hardness at the rung centers where such hardness is desired.

Various other features of the present invention will become obvious to one skilled in the art upon reading the disclosure set forth herein.

BRIEF SUMMARY OF THE INVENTION

More specifically, the present invention provides a method of treating ladder rungs for subsequent forming assembly with ladder rails comprising: moving a plurality of ladder rungs with their longitudinal axes in selected spaced parallel relation in a path extending substantially normal to the longitudinal axes of the rungs and adjacent a longitudinally extending heating zone through passage so that only preselected areas of said rungs pass through said heating zone through passage; and, controlling the residence time of movement and heated temperature of the preselected rung areas as they pass through the heating zone through passage to selectively soften the preselected rung areas to a state of desired forming hardness in accordance with the properties of the rungs without melting the rungs and without changing the physical properties of the remaining areas of the rungs. In addition, the present invention provides a structural apparatus for treating preselected areas of ladder rungs for subsequent forming assembly of the rungs with ladder rails comprising: a rung transport assembly having spaced stations to receive and position at one end thereof ladder rungs in selected aligned spaced relation for movement with the longitudinal axes of the rungs being in spaced parallel relation normal to the path of movement; spaced, opposed longitudinally extending controlled heater means cooperatively positioned with respect to the rung movement to provide a heated through passage to heat preselected areas of the rungs passed therebetween to a preselected forming hardness; and, means to receive the treated ladder rungs at the other end of the transport assembly. In addition, the present invention provides a novel structural arrangement for aligning the rungs with respect to the transport assembly and the heating means, a novel holding arrangement for holding the rungs in position on the transport assembly when being heated and a novel heating arrangement which provides for a pair of spaced, opposed longitudinally extending controlled heating sites on opposed extremities of the ladder rungs.

It is to be understood that various changes can be made by one skilled in the art in one or more of the several steps of the inventive method described herein and in one or more of the several parts of the herein described inventive structural arrangement without departing from the scope or spirit of the present invention.

BRIEF DESCRIPTION OF THE DRAWINGS

Referring to the drawings which disclose one advantageous embodiment which can be employed in carrying out the inventive method and apparatus;

FIG. 4 is an enlarged, partially broken plan view of a portion of one of the two, mirror-image, "C" channel induction heating assemblies disclosed in FIGS. 1-3 of the drawings, showing in phantom a plurality of rungs passing therethrough with the magnetic field of the hollow, fluid cooled induction heater selectively distorted by metallic bars or wafers extending between spaced branches at the opposed extremities of the "C" channel heating assembly;

FIG. 5 is a side view of the "C" channel induction heater structure of FIG. 4, showing in cross hatching the metallic bars or wafers extending between spaced hollow, fluid cooled branches, risers and downcomers at the "C" channel heating extremities;

FIG. 6 is an end view of the apparatus of FIG. 5 showing in phantom still another view of the distorted magnetic field of FIG. 4; and, FIG. 7 is a schematic view of the fluid flow pattern through the induction heater with a number of the branches, risers and downcomers being broken away for purposes of clarity.

DETAILED DESCRIPTION OF THE DRAWINGS

Figure 1:
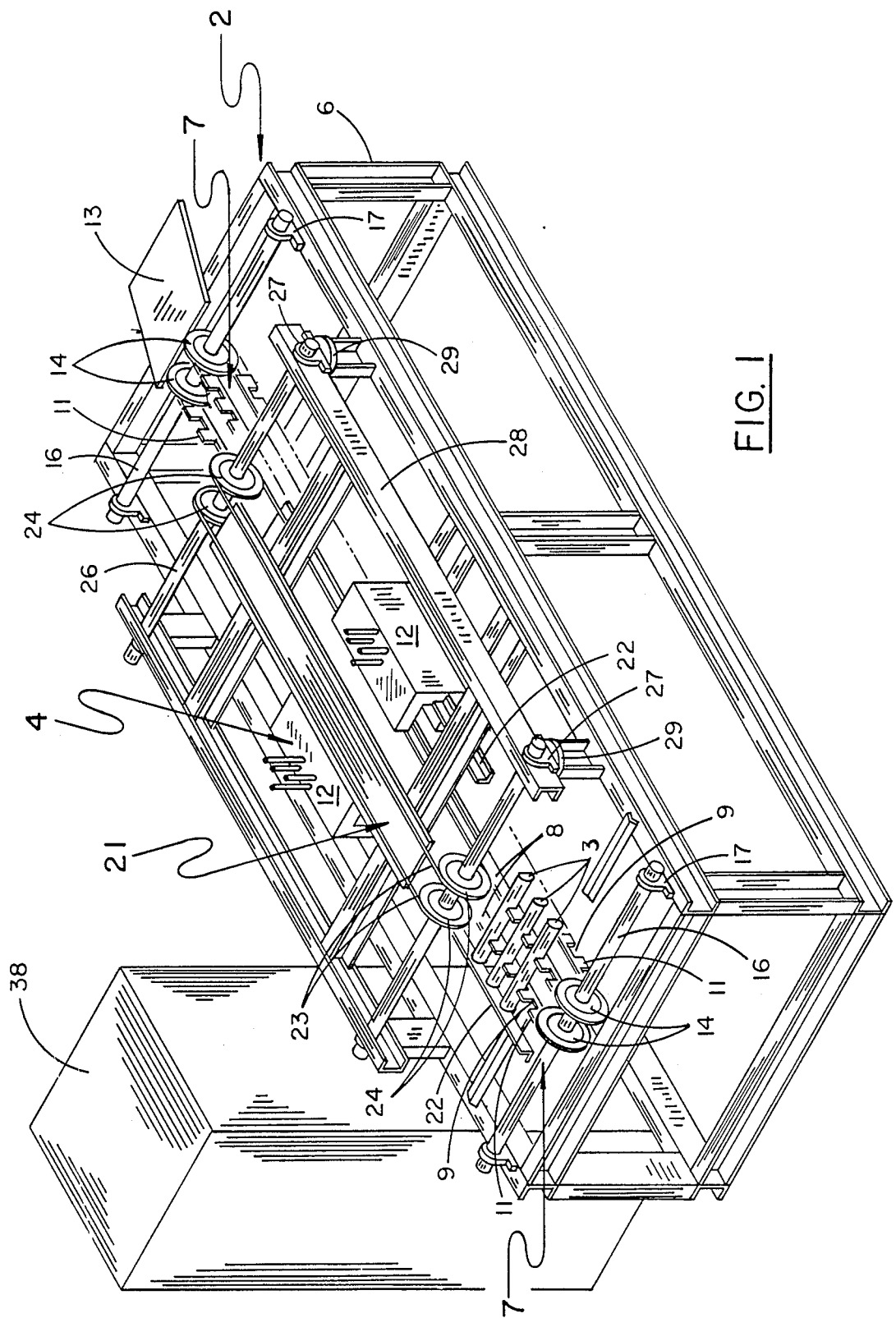
FIG. 1 is a broken isometric view of most of the apparatus used in carrying out the present invention, disclosing rungs of "D" cross-section along their longitudinal axes properly positioned for movement in a direction normal to their longitudinal axes through the opposed, mirror-image, "C" channel induction heaters, each of which provides for spaced, opposed longitudinally extending controlled heating.
Figure 2:
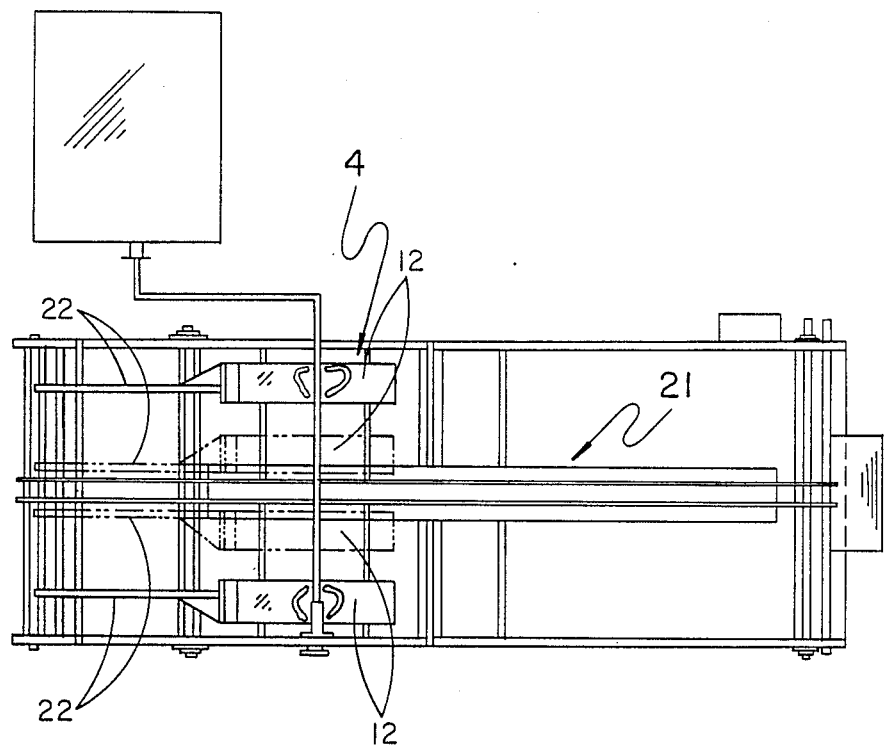
FIG. 2 is a plan view of the apparatus of FIG. 1.
Figure 3:
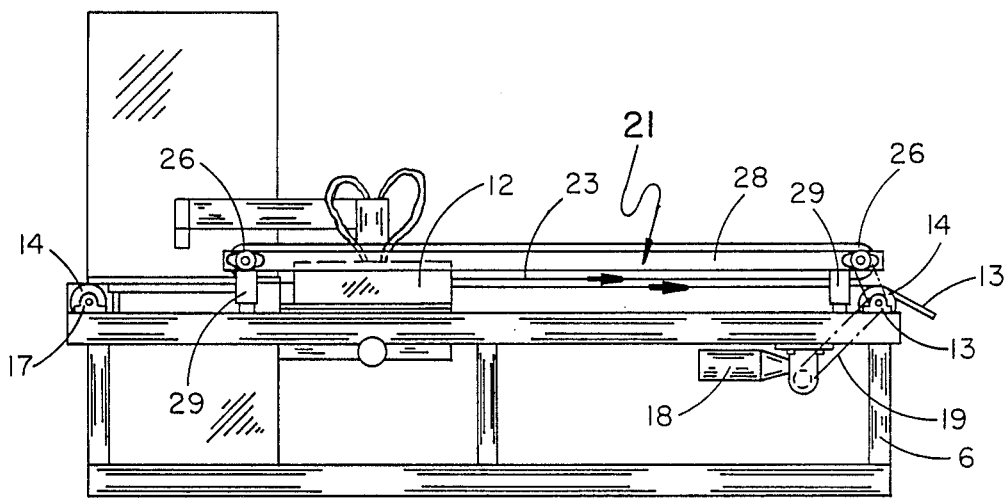
FIG. 3 is a side view of the apparatus of FIG. 1.
Figure 7:
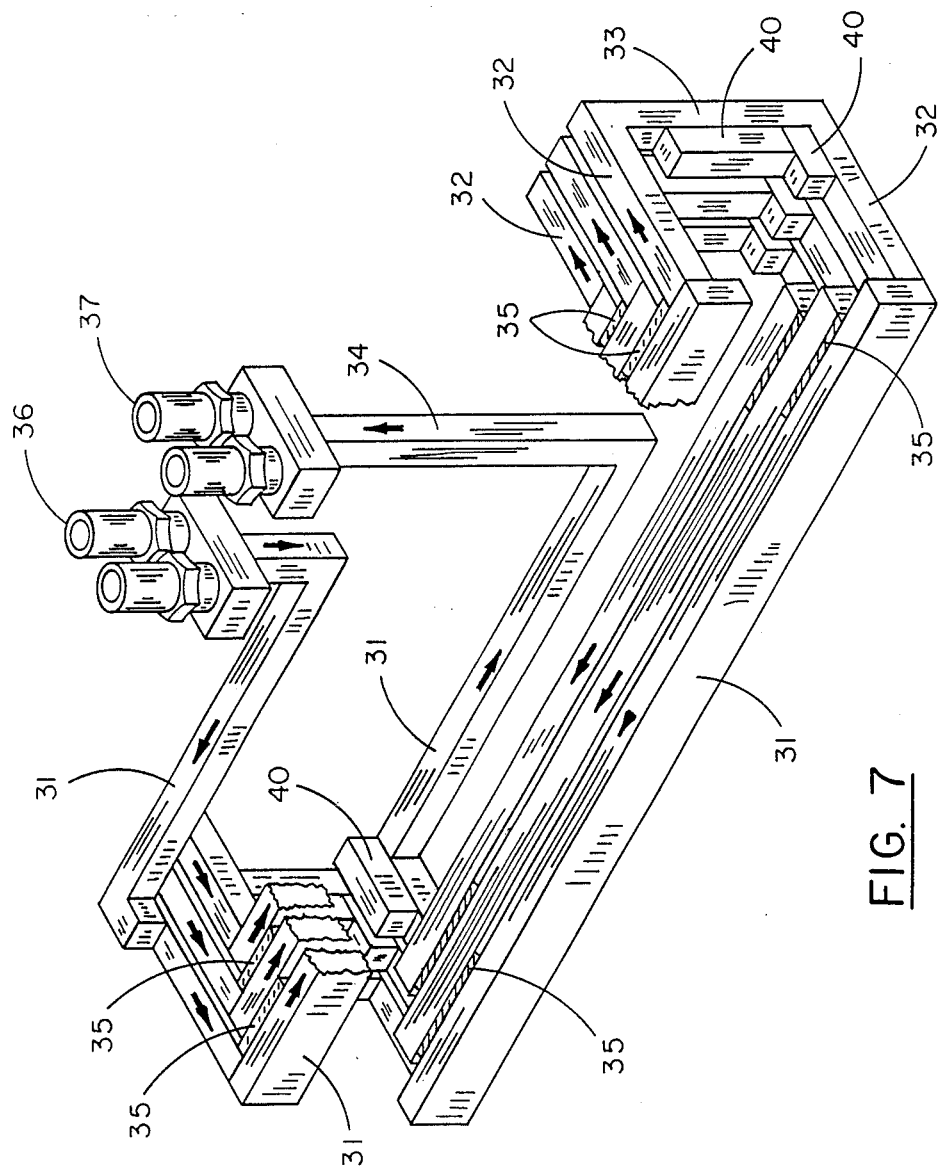

Referring to FIGS. 1-3 of the drawing, the novel structural apparatus 2 for treating preselected areas at the opposed ends of ladder rungs 3 is disclosed. Rungs 3 can be of a preselected metallic material such as an extruded aluminum alloy and can be of any one of a number of shapes and sizes. Generally, cross sections along the longitudinal axes of ladder rungs are either of a symmetrical, circular shape or of a non-symmetrical shape, such as a "D" or other non-symmetrical cross-section ladder rung and the outer peripheries of the rungs are provided with a plurality of appropriately spaced longitudinally extending serrations which serve to enhance footing. In the disclosed inventive embodiment, it is to be noted that rungs of "D" shaped cross-section along the longitudinal axes are disclosed, these non-symmetrical "D" shaped rungs being preselectively positioned for movement with their flat portions falling in a plane normal to the path of movement through the heater assembly 4 for reasons discussed hereinafter. It is to be understood, of course, that the present invention is not to be considered as limited to ladder rungs of non-symmetrical cross-section along the longitudinal axes but that rungs of other non-symmetrical cross-sections also can be treated by the unique structure and method of the present invention. Further, the herein disclosed inventive method and apparatus can be successfully employed to treat the ends of ladder rungs of materials other than metal—for example plastic or fiberglass—for subsequent formation and assembly with ladder stiles or rails.

As disclosed in FIGS. 1-3 of the drawings, a suitable structural support base 6 can be provided to support a transport assembly in the form of a moveable, endless belt assembly 7 formed by a pair of spaced, parallel longitudinally extending endless chain belts 8, each belt of the pair having spaced aligned rung stations 9 formed between normally extending lugs 11 on the chain belt. The spaced stations 9 between lugs 11 of each belt of the pair are aligned and serve to nestingly receive and position at one end of the pair of chain belts 8, the "D" shaped ladder rungs 3 in selected aligned spaced relation for movement along the upper flight of endless belt assembly 7 with the longitudinal axes of the "D" shaped rungs being in spaced parallel relation and each of their flat sides in a plane normal to the path of movement of the endless belt assembly upper flights between the pair of spaced, parallel opposed longitudinally extending controlled mirror-image "C" channel induction heaters 12 of the heater assembly 4. These heaters 12 serve to heat and soften or anneal preselected areas at opposite extremities of each of the rungs 3 from opposite sides as the rung extremities are passed between the opposed, through passage openings of the mirror-image "C" channel induction heaters 12 to a preselected formable hardness. The rungs 3 can be loaded unto the upper flight of belt assembly 7 at one end thereof either manually or by suitable automatic loading machinery (not shown). The end treated ladder rungs 3, after being appropriately heat treated, are passed at the other end of the endless belt assembly 7 to a receiving platform 13 to be moved to further ladder forming treatment and assembly with ladder stiles or rails (not shown). It is to be noted that the spaced sheaves 14 at opposite ends of chain belts 8 of belt assembly 7, for each endless chain belt 8 of the spaced pair are fixedly mounted on spaced, coextending rotatable shafts 16, the opposed ends of each rotatable shaft being mounted in spaced bearing housings 17. A suitable power drive 18 (FIG. 3) can be provided at one end of structural base 6 to index or continuously drive one of the rotatable shafts 16 through a belt drive or chain drive assembly 19. Drive assembly 19 also serves to drive a hold down belt assembly 21 positioned in adjustable spaced relation above belt assembly 7 in a manner described hereinafter.

As can be seen in FIGS. 1 and 2 of the drawings, a pair of opposed, parallel, longitudinally extending guide rails 22 are positioned above the upper flight of belt assembly which includes the pair of spaced, longitudinally extending endless chain belts 8. The longitudinal axes of these spaced guide rails 22 extend substantially normal to the longitudinal axes of rungs 3 with the guide rails being relatively adjustable for parallel movement toward and away from each other to be positioned adjacent to opposed extremities of rungs 3, different batches of which can be of different lengths. These pair of adjustable, spaced, parallel guide rails 22 serve to maintain the central alignment and positioning of the rungs on belt assembly 7 in spaced, parallel relation with their extremities aligned. In this regard, and as can be seen in FIGS. 1 and 2 of the drawing, one corresponding end of each guide rail 22 is adjustably fixed to one end of each of spaced heaters 12 of heater assembly 4. The other end of each guide rail 22 is connected to a suitable adjusting mechanism (such as a manually or automatically rotatable oppositely threaded rod, not shown) so that both the pair of spaced guide rails 22 and the pair of spaced heaters 12 can be readily and suitably adjusted simultaneously inwardly or outwardly (see phantom lines) to heat preselected end areas of aligned rungs 3, all in accordance with the lengths of the longitudinal axes of the rungs of a rung batch to be treated.

As previously mentioned, positioned above moveable belt assembly 7 is a hold down belt assembly 21. This belt assembly includes a pair of spaced parallel, longitudinally extending endless belts 23, the sheaves 24 of which are mounted on rotatable shafts 26 located at either end of the belts with their ends being rotatably mounted in bearing housings 27 supported on vertically adjustable support frame 28. Frame 28, in turn, is supported on structural base 6 through moveable supports such as inflatable-collapsible supports 29 positioned at the corner ends of frame 28 to elevate or lower the frame 28 and thus belt assembly 21 supported thereby, either pneumatically or hydraulically (details of such mechanism not being shown). It is to be noted that one of shafts 26 can be appropriately driven through the belt drive assembly 19 aforedescribed. It further is to be noted that suitable gearing (not shown) can be provided so that the lower flight of the hold down assembly is moved in the same direction as the upper flight of the rung transport assembly. With this hold down belt assembly 21, the lower flights thereof, moving at the same rate as the upper flights of belt assembly 7, can be adjustably moved in a vertical direction relative such upper flights of belt assembly 7, which, as aforedescribed, feeds rungs 3 to extend longitudinally and intermediate the extremities of such rungs 3, the guide rails 22 serving to position these rungs when mounted in the stations 9 between spaced lugs 11 and hold down assembly 21 serving to maintain aligned rungs 3 in position on belt assembly 7. It is to be noted that the upper flights of the endless hold down belts 22 can be arranged to pass through an appropriately slotted guide member 30 extending longitudinally in mounted position on support frame 28.

Referring to FIGS. 1 and 4-7 of the drawings, it can be seen that each of the opposed adjustably moveable heaters 12 of the heater assembly 4 advantageously is of the induction type and of "C" channel cross-section with the heaters 12 positioned so that the "C" channel induction heaters 12 form a pair of opposed mirror-image openings to each other located with respect to the pair of spaced, parallel longitudinally extending endless chain belts 8 to receive preselected areas of the opposed extremities of rungs 3 mounted on the upper flight of the pair of chain belts 8 to heat such preselected areas of rungs 3 as they pass through the opposed through passage openings along the path of movement of the upper flights of the endless chain belt pair 8.

As shown in FIGS. 4-7, each C-channel induction heater 12 includes a longitudinally extending housing of C-channel configuration in which is disposed electrically conductive hollow copper alloy induction heating members, each including horizontally extending, longitudinal headers 31 connected to spaced horizontally extending branch members 32 located at opposite longitudinal extremities of the C-channel heater 12 and to spaced apart vertically extending downcomers 33 and risers 34 with the downcomers and risers being located at the rear or back of the opposed through passage openings of the longitudinally extending C-channels and at opposite longitudinal extremities of such C-channel. The outer copper alloy walls of the hollow induction heating members furnish electrically conducted induction heating paths between terminal blocks 36 and 37 connected to a suitable power source 38. The inner surfaces of the walls provide a cooling fluid flow-through path (see FIG. 7) for a suitable cooling fluid such as water. The spaced branches 32, downcomers 33, and risers 34 at opposite ends of each induction heater C-channel are selectively provided with ferrite wafer bars 35 and ferrite blocks 40 (see FIG. 7) which can be selectively positioned in the spaces therebetween and mounted at the "C" channel extremities, the extent of these wafer bars and blocks being empirically calculated to distort the magnetic fields produced by each induction heater at the ends thereof (see FIGS. 4 and 6) to selectively concentrate the heat to be transmitted to preselected rung extremities to be intermediate the longitudinal extremities of the "C" channels and to heat the preselected rung extremity areas so that heat flows in either direction along the preselected areas of the rung extremities when projected for passage through the longitudinally extending opposed through passage openings of the directly opposed C-channel induction heaters.

It is to be noted that the endless belt assembly 7 can be extended a substantial distance beyond heaters 12 so as to accommodate for additional forming steps on the rung extremities for subsequent assembly with ladder stiles. It further is to be noted that any one of a number of changes can be made in one or more of the several parts of the invention described above by one skilled in the art without departing from the scope of the invention. For example, instead of the disclosed endless hold down belt assembly, adjustable, longitudinally extending non-magnetic bars with a smooth under surface could be provided and it would be possible to use other heating furnace arrangements, other ferrite arrangements and other actuating members to move the several moveable parts of the described apparatus.

In carrying out the several steps of the inventive method for treating ladder rungs, such as "D" rungs 3, for subsequent forming of such rungs with ladder stiles or rails, a plurality of such extruded aluminum alloy ladder rungs having a minimum yield strength of approximately 35,000 psi and a minimum tensile strength of approximately 38,000 psi and which have been age hardened to a range of approximately fourteen (14) to eighteen (18) Webster are continuously moved (belt assembly 7) at a preselected speed rate determined by the heater length (such as approximately twenty (20) to sixty (60) rungs per minute) in guidedly adjusted guide rails 22, spaced parallel relation (lugs 11) with spaces (9) between adjacent longitudinal rung axes being in the range of approximately one and one-half (1½) to three (3) inches in a held down path of movement normal to the spaced longitudinal rung axes and adjacent a through passage heating zone (4) including a pair of longitudinally extending induction heating sites (opposed heaters 12) adjusted simultaneously in accordance with the guidingly adjusted rungs (22) and positioned to extend in spaced, opposed mirror-image C-shaped cross-sectional through passage configuration along one and one-half (1½) to three (3) inches of the opposed extremities of each of the rungs. The rungs can be either of symmetrical or non-symmetrical cross-section along their longitudinal axes and, if non-symmetrical, are positioned in a preselected manner in accordance with the longitudinal axes cross-sectional geometry in a manner to avoid burning or melting at the flat sides of the rungs and to optimize heating of the opposite rung extremities. Further, the magnetic fields at the opposite extremities of the induction heating zone sites are distortively shaped away from the rung extremities to avoid excessive heating temperature at the entrance and exit of the heating sites. It is to be noted that the majority of the heating is concentrated at a preselected distance from the end of the rung so that heat will flow in opposite directions at the opposed rung extremities. The heating sites of the heating zone are powered electrically in a preselected power range to obtain the desired heating, such as eighteen (18) to fifty (50) KW and a suitable frequency in the range of approximately eight (8) to fifty (50) kilohertz, and the residence time of the rung extremities in the heating zone for the rung extremities to reach a temperature of 600° F. is accomplished in a range of approximately eighteen (18) to twenty-two (22) seconds. Finally, it is to be noted that after the rung extremities have passed through the heating sites, they can be immediately cooled by any one of a number of cooling agents.

The invention claimed is:

1. A method of treating ladder rungs for subsequent forming assembly with ladder rails comprising:

moving a plurality of ladder rungs with their longitudinal axis in selected spaced parallel relation in a path having the longitudinal axis thereof extending substantially normal to said longitudinal axis of said rungs and adjacent a longitudinally extending through passage hearing zone so that only preselected areas of said rungs pass through said heating zone through passage; and, controlling the residence time of movement and heated temperature of said preselected rung areas as they pass through said through passage heating zone to selectively soften said preselected rung areas to a state of desired forming hardness in accordance with the physical properties of said rungs without melting said rungs and without changing the physical properties of the remaining areas of the rungs.

2. The ladder rung treating method of claim 1, wherein said heating zone through passage includes longitudinally extending spaced opposed heating sites.

3. The ladder rung treating method of claim 1, wherein said preselected areas of each of said rungs to be formed by exposure to said heating zone is at preselected opposite extremities of each rung and said heating zone includes a pair of spaced opposed through passage heating locations, longitudinally extending along opposed extremities of said rungs in their path of movement.

4. The ladder rung treating method of claim 1, wherein said preselected area of each of said rungs to be formed by exposure to said heating zone is at preselected opposite extremities of each rung and said heating zone through passage includes a pair of spaced opposed through passage heating locations, each through passage location including spaced opposed heating sites extending longitudinally along opposed extremities of said rungs in their path of movement to first heat the opposed faces and the side end face therebetween of said rung extremities.

5. The ladder rung treating method of claim 1, wherein said longitudinally extending through passage heating zone is of the induction type with the magnetic fields at the extremities thereof being shaped to further control the heating temperature thereof to avoid excessive heating temperature at the entrance and exit of said through passage heating zone.

6. The ladder rung treating method of claim 1, wherein said ladder rungs are firmly held in preselected position in said path of movement through said heating zone.

7. The ladder rung treating method of claim 1, wherein said ladder rungs are of non-symmetrical cross-section and are positioned along their respective longitudinal axes in a preselected manner to optimize uniform heating of that area of each of said rungs exposed to said through passage heating zone.

8. The ladder rung treating method of claim 1, wherein said ladder rungs are of "D" cross-section along their longitudinal axes and are positioned along their respective longitudinal axes with the flat portion thereof in a plane normal to said path of movement to optimize uniform heating of that area of each of said rungs exposed to said through passage heating zone.

9. The ladder rung treating method of claim 1, wherein said ladder rungs are of an extruded aluminum alloy and said controlled residence time of movement through said through passage heating zone is at least fifteen (15) seconds until said rungs heat to a minimum of temperature of 600° F.

10. The ladder rung treating method of claim 1, wherein said ladder rungs are of an extruded aluminum alloy and said controlled residence time of said rung in said heating zone is controlled so that the heated area of the rung reaches a temperature of 600° F. in the range of eighteen (18) to twenty-two (22) seconds.

11. The ladder rung treating method of claim 1, wherein said ladder rungs are of an extruded aluminum alloy and are age hardened to a hardness range of approximately fourteen to eighteen (14-18) Webster prior to exposing selected areas to said heating zone.

12. The ladder rung treating method of claim 1, wherein said ladder rungs are of an extruded aluminum alloy and are age hardened in said preselected areas exposed to said heating zone to a hardness range of approximately zero to twelve (0-12) Webster.

13. The ladder rung treating method of claim 1, wherein said area of each of said rungs to be formed by exposure to said through passage heating zone extends in the range of one and one-half (1½) to three (3) inches from the opposed side end faces of each rung with said through passage heating zones including a pair of spaced directly opposed parallel through passage heating locations positioned to extend longitudinally along opposed extremities of said rungs in their path of movement to first heat the opposed faces and the end face therebetween of said rung extremities with the heat concentrated so that heat flows in opposite directions at the opposed rung extremities.

14. The ladder rung treating method of claim 1, said spaced rungs being spaced approximately three (3) inches apart and moved in said path of movement at a rate in the range of approximately twenty (20) to sixty (60) rungs per minute with said heating zone being powered electrically in the range of approximately eighteen (18) to fifty (50) KW and preselected frequency.

15. The ladder rung treating method of claim 1, and immediately cooling said areas of said rungs exposed to said through passage heating zone.

16. The ladder rung treating method of claim 1, wherein the heating is so concentrated that heat flows in opposite directions of the heated areas of the rungs.

17. The ladder rung treating method of claim 1, said rungs being of extruded aluminum alloy having a minimum yield strength of approximately 35,000 psi and a minimum tensile strength of approximately 38,000 psi.

18. The ladder rung treating method of claim 1, and moving said ladder rungs after said heating step and while in said path of movement to a forming zone extending along said path of movement to form each of said heated areas.

19. The ladder rung treating method of claim 1, wherein said rungs have their extremities initially aligned in their path of movement relative said longitudinally extending through passage heating zone.

20. The ladder rung treating method of claim 1, wherein said rung extremities and said through passage heating zone are adjustably and simultaneously aligned in the initial path of movement of said rings relative said longitudinally extending heating zone.

21. A method for treating preselected areas of ladder rungs for subsequent forming of said rungs with ladder rails comprising:

moving a plurality of extruded aluminum alloy rungs with a minimum yield strength of approximately 35,000 psi and age hardened to a range of fourteen (14) to eighteen (18) Webster at a speed rate in the range of twenty (20) to sixty (60) rungs per minute in guidedly adjusted spaced parallel relation with spaces between the adjacent longitudinal axis of said rungs being in the range of approximately one and one-half (1½) to three (3) inches in a held down path of movement having the longitudinal axis thereof normal to said spaced longitudinal rung axis and adjacent a through passage heating zone including a pair of longitudinally extending induction heating locations, each having opposed heating sites adjusted simultaneously in accordance with the guidedly adjusted rungs and positioned to extend in spaced, opposed mirror-image c-shaped cross-sectional configuration along one and one-half (1½) to three (3) inches of the opposite extremities of each of said rungs with said rungs being of non-symmetrical cross-section along their longitudinal axis and positioned in a preselected manner to optimize heating of opposite extremities of said rungs; said opposed inductions heating sites having the magnetic fields at the longitudinal extremities thereof shaped to control the heating temperature at said heating site extremities with heat flowing along the opposite rung extremities in each direction therefrom, said heating locations and opposed sites thereof of said heating zone being powered electrically in the range of approximately eighteen (18) to fifty (50) KW at a preselected frequency in the range of eight (8) to fifty (50) kilohertz with said rungs having a controlled residence time of movement through said opposed heating sites int he range of eighteen (18) to twenty-two (22) seconds to reach a temperature of at least 600°.

22. A structural apparatus for treating preselected areas of ladder rungs for subsequent forming assembly of said rungs with ladder rails comprising:

transport assembly having spaced stations to receive and position at one end thereof ladder rungs in selected aligned spaced relation for movement along one flight of said transport assembly with the longitudinal axes of said rungs being in spaced, parallel relation normal to said path of movement of said transport assembly;

spaced opposed longitudinally extending controlled heater means cooperatively positioned with respect to said endless belt flight to provide a heated through passage to heat preselected areas of said rungs passed therebetween to a preselected forming hardness; and, means to receive said treated ladder rungs at the other end of said endless belt.

23. The structural apparatus for treating ladder rungs of claim 22, and aligning means to centrally align and position said ladder rung extremities on said transport assembly in spaced, parallel relation at that end of said transport assembly receiving said ladder rungs.

24. The structural apparatus for treating ladder rungs of claim 22, and adjustable aligning means to centrally align and position said ladder rung extremities on said transport assembly in spaced, parallel relation at that end of said transport assembly receiving said ladder rungs and simultaneously to align said heater means.

25. The structural apparatus for treating ladder rungs of claim 22, and aligning means to align ladder rung extremities including a pair of opposed, parallel, moveable guide rails to receive said ladder rungs therebetween with the longitudinal axes of said rungs being substantially normal to said guide rails, said guide rails being moveably adjustable relative each other to be positioned adjacent to opposed extremities of said rungs to maintain the central alignment and positioning of said rungs on said transport assembly in spaced, parallel relation.

26. The structural apparatus for treating ladder rungs of claim 22, said transport assembly being in the form of a pair of coextending spaced, parallel endless chain belts including spaced lugs extending normally from the line of movement thereof with the spaces between adjacent lugs being sized in preselected fashion in accordance with the cross-sectional area of said rungs and with the spaces of one of said spaced, parallel chain belts being aligned with the spaces of the other of said belts to nestingly receive and position said rungs with their longitudinal axes in spaced parallel relation.

27. The structural apparatus for treating ladder rungs of claim 22, and a moveable hold down means positioned adjacent said flight of said transport assembly receiving said rungs and being movable relative said transport assembly to abut and firmly hold rungs disposed thereon.

28. The structural apparatus for treating ladder rungs of claim 22, and hold down means including a moveable endless belt with a hold down flight thereof positioned adjacent said transport assembly receiving said rungs to be movable relative said assembly intermediate opposed extremities of said rungs to abut and firmly hold rungs disposed thereon.

29. The structural apparatus for treating ladder rungs of claim 22, said spaced, opposed longitudinally extending controlled heater means each including an electrically conductive hollow member with a cooling fluid circulated through the hollow portion thereof.

30. The structural apparatus for treating ladder rungs of claim 22, said spaced, opposed longitudinally extending controlled heater means each including an electrically conductive hollow member with a liquid cooling fluid circulated through the hollow portion thereof.

31. The structural apparatus for treating ladder rungs of claim 22, said spaced, opposed longitudinally extending controlled heater means each including an electrically conductive hollow induction heating member with a cooling fluid circulated through the hollow portion thereof with the entrance and exit portions thereof having means associated therewith to shape the magnetic fields.

32. The structural apparatus for treating ladder rungs of claim 22, said spaced, opposed longitudinally extending controlled heater means cooperatively positioned with respect to said transport assembly including a pair of mirror-image opposed channels of "C" cross-section positioned with respect to said endless belt with opposed through passage openings serving to receive and heat preselected areas at the opposed extremities of said rungs to heat said areas as they pass through said opposed through openings of said C-channels in the path of movement of the flights of said transport assembly.

33. The structural apparatus for treating ladder rungs of claim 22, said spaced opposed longitudinally extending controlled heater means cooperatively positioned with respect to said transport assembly including a pair of mirror-image channels of "C" cross-section adjustably positioned with respect to said transport assembly with opposed through passage openings serving to adjustably receive preselected areas at the opposed extremities of variable lengths of said rungs to heat said areas as they pass through said opposed openings of said C-channels in the path of movement of the transport assembly.

34. The structural apparatus for treating ladder rungs of claim 22, said spaced opposed longitudinally extending controlled heater means cooperatively positioned with respect to said transport assembly including a pair of mirror-image channels of "C" cross-section having opposed through passage openings positioned with respect to said transport assembly to receive preselected areas at the opposite extremities of said rungs to heat said areas as they pass through said opposed through passage openings of said C-channels in the path of movement of said transport assembly, said channels each including electrically conductive hollow induction heating members comprised of longitudinally extending headers connected to spaced riser means, spaced downcomer means, and spaced branch members at opposed extremities of said headers with said branch members extending normally from said headers, risers and downcomers to provide a cooling fluid flow-through path therebetween and to include distortion bars and blocks associated with the risers, downcomers and branch members to shape the magnetic fields from said inductive heaters at said extremities of said "C" channels.

35. A structural apparatus for treating preselected areas of ladder rungs for subsequent forming assembly of said rungs with ladder rails comprising:

a moveable endless belt assembly in the form of a pair of coextending spaced, parallel endless chain belts having spaced lugs extending normally from the line of movement thereof with the spaces between adjacent lugs being sized in preselected fashion in accordance with the cross-sectional area of said rungs and with the spaces of said pair of chain links being aligned to nestingly receive and position ladder rungs with their longitudinal axes in spaced, parallel relation for movement in a path normal to the direction of the axes of said rungs;

a pair of opposed, parallel longitudinally extending adjustable guide rails positioned above the upper flight of said pair of endless chain belts with the longitudinal axes of said guide rails extending substantially normal to said ladder rung axes, said guide rails being moveably adjustable relative each other to be positioned adjacent to opposed extremities of said rungs to maintain the central alignment and positioning of said rungs on said belt in spaced, parallel relation;

a moveable hold down assembly including a pair of endless belts positioned above the upper flight of said pair of chain link belts receiving said rungs to be moveable relative said upper flight intermediate opposed extremities of said spaced rungs carried by said pair of spaced endless chain link belts and firmly hold said rungs positioned in said spaced lugs on said chain link belts;

a moveably adjustable pair of spaced, opposed, longitudinally extending controlled induction heaters cooperatively positioned along opposed sides of said pair of endless chain link belts, said pair of induction heaters comprising a pair of mirror-image channels of "C" cross-section having opposed through passage openings located with respect to said pair of spaced, parallel longitudinally extending endless chain belts to receive preselected areas at the opposite extremities of said rungs mounted on the upper flights of said endless belts to heat said areas as they pass through said opposed through passage openings of said C-channels in the path of movement of the flights of said belt pairs, said channels each including electrically conductive hollow induction heating members comprised of longitudinally extending headers connected to spaced risers and spaced downcomers at the rear of said opposed through passage openings and spaced branch members at opposed extremities of said headers with said branch members extending normally from said headers, risers and downcomers to provide a cooling fluid flow-through path therebetween and to include ferrite bars and blocks associated with said risers, downcomers and branch members to distort the magnetic fields from said induction heaters at said extremities of said "C" channels; and, adjustable linkage connected to said opposed guide rails and said opposed "C" channel heaters to adjust the spaces therebetween in accordance with the length of said rungs to be treated.

* * * * *